United States Patent Office 2,751,393
Patented June 19, 1956

2,751,393

IMIDAZOLINE DERIVATIVES OF ARYL INDOLES

Walter Schindler and Franz Häfliger, Basel, Switzerland, assignors to J. R. Geigy A. G., Basel, Switzerland, a Swiss firm No Drawing. Application May 11, 1954,
Serial No. 429,102

Claims priority, application Switzerland May 13, 1953

2 Claims. (Cl. 260—309.6)

This invention is concerned with imidazoline derivatives of 2-aryl indoles of the general formula:

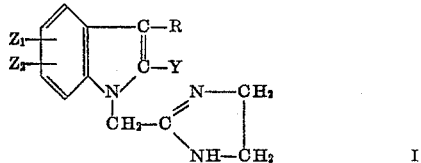

wherein R represents hydrogen or a lower alkyl group,
Y represents a member selected from the group consisting of phenyl radicals substituted at vicinal carbon atoms by a bivalent radical selected from the group consisting of trimethylene and tetramethylene radicals; phenyl and naphthyl radicals, the phenyl radicals being substituted by at most two members selected from the group consisting of hydrogen, halogen, lower alkyl, lower alkoxy and hydroxy radicals, the naphthyl radicals being substituted by one member selected from the group consisting of hydrogen, halogen and lower alkyl radicals,
$Z_1$ represents hydrogen, halogen, a lower alkyl or alkoxy group or a hydroxyl group and
$Z_2$ represents hydrogen, halogen or a lower alkyl group.

It has now been found that compounds of this type have an excellent sympathicolytic action.

The new compounds can be produced by reacting at a raised temperature a compound of the general formula:

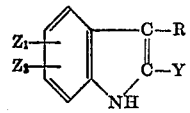

with a salt of a 2-halogen methyl-imidazoline of the general formula:

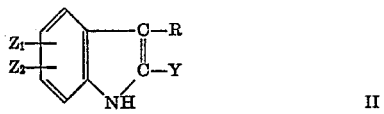

wherein Hal represents a halogen atom and R, Y, $Z_1$ and $Z_2$ have the meanings given above. At about 130–160°, the reaction is completed within a few hours. It is advantageous to perform the reaction in a melt without the addition of solvents or diluents whilst ensuring the exclusion of oxygen from the atmosphere. If desired compounds containing alkoxy groups can then be hydrolysed to form compounds containing hydroxyl groups.

A modification of the method described above which can be used, however, only for the production of derivatives containing no hydroxyl groups consists in converting a compound of the general formula:

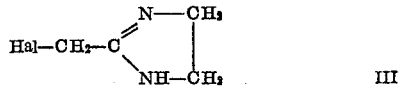

wherein R and $Z_2$ have the meanings given above, and
Y' has the meaning given above for Y with the exception of hydroxyl substituted phenyl or naphthyl radicals, and
$Z'_1$ has the meaning given above for $Z_1$ with the exception of the hydroxyl group,
into its alkali salt by means of a compound giving off alkali, such as, e. g. sodium amide, potassium amide, lithium hydride or by means of an alkali metal and then reacting this alkali salt with a 2-halogen methyl-imidazoline of the general Formula III. This reaction is performed advantageously in solvents at less high temperatures, e. g. in boiling benzene or in other hydrocarbons of the benzene series.

The 2-aryl indoles and their substitution products necessary as starting materials are easily obtained from phenyl hydrazones, which may be substituted if desired, of acetophenone, propiophenone, butyrophenone, β-acetonaphthone etc., as well as further substitution products of the latter which carry in the aromatic nucleus of the ketone component and/or of the hydrazine component the substituents according to the definition, by heating with zinc chloride. They can also be easily obtained by heating with ether borofluoride in an inert solvent such as toluene.

The following compounds for example can be named as substituted 2-aryl indoles:

2-(4'-chlorophenyl)-indole,
2-(4'-bromophenyl)-indole,
2-(4'-methyl-phenyl)-indole,
2-(4'-ethyl-phenyl)-indole,
2-(4'-isopropyl-phenyl)-indole,
2-(3'-methyl-4'-chlorophenyl)-indole,
2-(3'.4'-dimethyl-phenyl)-indole,
2-hydrindenyl-(5')-indole,
2-[5'.6'.7'.8'-tetrahydronaphthyl-(2')]-indole,
2-β-naphthyl-indole,
2-(2'-methoxy-phenyl)-indole,
2-(3'-methoxy-phenyl)-indole,
2-(4'-ethoxy-phenyl)-indole,
2-(3'-hydroxyphenyl)-indole,
2-(4'-hydroxyphenyl)-indole,
2-phenyl-5-chlor-indole,
2-phenyl-6-chlor-indole,
2-phenyl-5.6-dichlor-indole,
2-phenyl-5-brom-indole,
2-phenyl-5-methyl-indole,
2-phenyl-7-methyl-indole,
2-phenyl-5.6-dimethyl-indole,
2-phenyl-5-methoxy-indole,
2-phenyl-6-methoxy-indole,
2-phenyl-5-hydroxy-indole,
2-(4'-chlorophenyl)-5-chlor-indole,
2-(4'-hydroxyphenyl)-5-chlor-indole,
2-(4'-chlorophenyl)-5-methyl-indole,
2-(3'-methoxy-phenyl)-6-methoxy-indole, 2-phenyl-3-methyl-indole,
2-β-naphthyl-3-methyl-indole,
2-[5'.6'.7'.8'-tetrahydronaphthyl-(2')]-3-methyl-indole,
2-phenyl-3-ethyl-indole,
2-phenyl-3-propyl-indole,
2-phenyl-3-isopropyl-indole.

2-chloromethyl- and 2-bromomethyl-4.5-imidazoline can be used as second reaction component. They can be easily obtained from chloro- or bromo- acetonitrile and ethylene diamine.

With inorganic or organic acids such as e. g. hydrochloric acid, hydrobromic acid, sulphuric acid, phosphoric acid, ethane disulphonic acid, methane sulphonic acid, tartaric acid, acetic acid, or citric acid, the new compounds form salts some of which are easily soluble in water.

The new compounds can be administered therapeutically, e. g. for the treatment of disturbances of the peripheral circulation or of hypertension, either per os or parenterally. The new compounds can be formed into tablets either as such or in the form of their salts combined with suitable carriers, e. g. with starch, lactose or talc. The aqueous solutions of some of the salts have an almost neutral reaction. After being made isotonic, if necessary and after sterilization, they can also be administered by injection. If desired, for therapeutical application the new compounds can be combined with substances having a similar action or, for example, with substances having a blocking effect on the ganglia.

EXAMPLE 1

*1-[imidazolinyl-(2')methyl]-2-phenyl indole*

4.75 parts of 2-phenyl indole (Org. Synth. 22, 98) are dissolved in 50 parts of volume of abs. benzene. A suspension of 1.15 parts of sodium amide in 30 parts by volume of abs. toluene is added dropwise at 40–50°. On completion of the dropwise addition, the whole is boiled for ¾ of an hour under reflux, cooled to 50–60° and at this temperature a benzene solution of the base liberated from 4.8 parts of 2-chloromethylimidazoline-hydrochloride is added dropwise. The whole is kept for 30 minutes at 50–60° and then heated for 3 hours under reflux, after which it is cooled and 30 parts by volume of water are added. The benzene solution is taken off, washed twice with a little water and then shaken out three times with 30 parts by volume of 2N acetic acid. The acid extracts are made alkaline with concentrated caustic soda lye and rapidly extracted with ethyl acetate. After washing and drying the ethyl acetate solution, it is evaporated in which process the desired 1-[imidazolinyl-(2')-methyl]-2-phenyl indole crystallises out. It can be recrystallised from alcohol/ether. M. P. 181–182°, on decomposition.

EXAMPLE 2

*1 - [imidazolinyl - (2') - methyl] - 2 - (4" - chloro - phenyl)5-chlorindole*

10 parts of 2-(4'-chlorophenyl)-5-chlorindole (produced analogous to Org. Synth. 22, 98) and 5 parts of 2-chloromethylimidazoline hydrochloride are heated in an oil bath at 155–160° inner temperature for 6 hours under the introduction of nitrogen. The reaction mixture is then boiled out 4 times with water, the filtered aqueous extracts are made alkaline with concentrated ammonia and the 1 - [imidazolinyl - (2') - methyl] - 2 - (4"-chlorophenyl)-5-chlorindole which precipitates is recrystallised from alcohol. M. P. 268–270°.

The following compounds can be produced in an analogous manner:

1 - [imidazolinyl - (2') - methyl] - 2 - (4" - chloro - phenyl)-indole, M. P. 220–223° on decomposition;
1 - [imidazolinyl - (2') - methyl] - 2 - (4" - methyl-phenyl)-indole, M. P. 210–212°;
1 - [imidazolinyl - (2') - methyl] - (4" - ethyl - phenyl)-indole, M. P. 196–197°;
1 - [imidazolinyl - (2') - methyl] - (3",4" - dimethyl-phenyl)-indole, M. P. 205–206°;
1 - [imidazolinyl - (2') - methyl] - 2 - hydrindenyl - (4")-indole, M. P. 217–218°;
1 - [imidazolinyl - (2') - methyl] - 2 - [5",6",7",8" - tetrahydronaphthyl-(2")]-indole, M. P. 199–200°;
1 - [imidazolinyl - (2') - methyl] - 2 - β - naphthyl-indole, M. P. 206–208°;
1 - [imidazolinyl - (2') - methyl] - 2 - phenyl - 5 - chlor-indole, M. P. 240–241°;
1 - [imidazolinyl - (2') - methyl] - 2 - (4" - methyl-phenyl)5-chlor-indole, M. P. 264—265°;
1 - [imidazolinyl - (2') - methyl] - 2 - phenyl - 5,6-dichlor-indole;
1 - [imidazolinyl - (2') - methyl] - 2 - phenyl - 5 - methyl-indole, M. P. 226–228°;
1 - [imidazolinyl - (2') - methyl] - 2 - (4" - chloro - phenyl-5-methyl-indole, M. P. 270–272° on decomposition:
1 - [imidazolinyl - (2') - methyl] - 2 - (4" - methyl-phenyl)-5-methyl-indole, M. P. 246–247°;
1 - [imidazolinyl - (2') - methyl] - 2 - phenyl - 5,6 - dimethyl-indole, M. P. 222–223°;
1 - [imidazolinyl - (2') - methyl] - 2 - phenyl - 6 - methyl-indole, M. P. 179–180°;
1 - [imidazolinyl - (2') - methyl] - 2 - (4" - methyl-phenyl)-6-methoxy-indole, M. P. 152–153°;
1 - [imidazolinyl - (2') - methyl] - 2 - (4" - ethyl-phenyl)-6-methoxy-indole;
1 - [imidazolinyl - (2') - methyl] - 2 - β - naphthyl - 6-methoxy-indole;
1 - [imidazolinyl - (2') - methyl] - 2 - phenyl - 3-methyl-indole, M. P. 154°;
1 - [imidazolinyl - (2') - methyl] - 2 - (4" - ethyl-phenyl)-3-methyl-indole;
1 - [imidazolinyl - (2') - methyl] - 2 - β - naphthyl - 3-methyl-indole;
1 - [imidazolinyl - (2') - methyl] - 2 - [5",6",7",8"-tetrahydronaphthyl-(2")]-indole;
1 - [imidazolinyl - (2') - methyl] - 2 - phenyl - 3 - ethyl-indole;
1 - [imidazolinyl - (2') - methyl] - 2 - (4" - bromo-phenyl)-indole;
1 - [imidazolinyl - (2') - methyl] - 2 - [6" - chloro-naphthyl-(2")]-indole;
1 - [imidazolinyl - (2') - methyl] - 2 - [6" - bromo-naphthyl - (2")]-indole;
1 - [imidazolinyl - (2') - methyl] - 2 - [6" - methyl-naphthyl-(2")]-indole; and
1 - [imidazolinyl - (2') - methyl] - 2 - [6" - tert. butyl - naphthyl-(2")]-indole.

What we claim is:
1. A compound corresponding to the general formula:

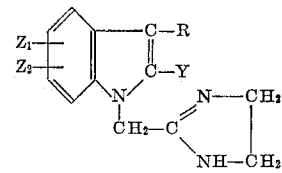

wherein R represents a member selected from the group consisting of hydrogen and lower alkyl radicals, Y represents a member selected from the group consisting of phenyl radicals substituted at vicinal carbon atoms by a bivalent radical selected from the group consisting of trimethylene and tetramethylene radicals; phenyl and naphthyl radicals, the phenyl radicals being substituted by at most two members selected from the group consisting of hydrogen, halogen, lower alkyl, lower alkoxy and hydroxy radicals, the naphthyl radicals being substituted by one member selected from the group consisting of hydrogen, halogen and lower alkyl radicals, $Z_1$ represents a member selected from the group consisting of hydrogen, halogen, lower alkyl, lower alkoxy and hydroxyl radicals, and $Z_2$ represents a member selected from the group consisting of hydrogen, halogen and lower alkyl radicals.

2. 1 - [imidazolinyl - (2') - methyl] - 2 - β - napththyl-indole.

References Cited in the file of this patent

UNITED STATES PATENTS

| | | |
|---|---|---|
| 2,505,247 | Isler | Apr. 27, 1950 |
| 2,569,415 | Hartmann et al. | Sept. 25, 1951 |

FOREIGN PATENTS

| | | |
|---|---|---|
| 377,255 | Great Britain | July 14, 1932 |
| 608,295 | Great Britain | Sept. 13, 1948 |

OTHER REFERENCES

Chu et al.: Chem. Abst., vol. 41, col. 3869 (1947).